United States Patent [19]

Scott

[11] Patent Number: 5,059,141

[45] Date of Patent: Oct. 22, 1991

[54] MODEM/TELEPHONE HANDSET CORD ADAPTOR

[76] Inventor: Xenophon C. Scott, 12114 Folkstone Dr., Herndon, Va. 22071

[21] Appl. No.: 447,861

[22] Filed: Dec. 8, 1989

[51] Int. Cl.[5] .......................................... H01R 27/00
[52] U.S. Cl. ................................... 439/638; 379/442
[58] Field of Search .............. 439/300, 628, 638, 651, 439/668, 676; 379/98, 442, 443

[56] References Cited

U.S. PATENT DOCUMENTS

| | | | |
|---|---|---|---|
| 3,736,379 | 5/1973 | Kagan | 379/428 |
| 3,934,088 | 1/1976 | Marino | 179/2 DP |
| 4,295,702 | 10/1981 | Snyder | 379/442 |
| 4,367,374 | 1/1983 | Serrano | 179/2 C |
| 4,395,590 | 7/1983 | Pierce et al. | 379/98 |
| 4,444,451 | 4/1984 | Myers | 439/638 |
| 4,493,951 | 1/1985 | Sanderson et al. | 439/638 |
| 4,543,450 | 9/1985 | Brandt | 379/442 |
| 4,611,875 | 9/1986 | Clarke et al. | 439/638 |
| 4,648,682 | 3/1987 | Tubbs | 439/391 |
| 4,673,228 | 6/1987 | Ditzig | 439/638 |
| 4,907,267 | 3/1990 | Gutzmer | 379/442 |

OTHER PUBLICATIONS

Phoneflex, TVMP Inc., 5 pp. 6/1988.
One page of advertising (undated) "Adeline and Insta-Jack", 27 PC Magazine, Feb. 27, 1990.

Primary Examiner—Paula A. Bradley
Attorney, Agent, or Firm—Dowell & Dowell

[57] ABSTRACT

An adaptor for connecting the conventional plug which connects a telephone handset to a modem so that a computer connected to the modem may be operably connected to the transmitter circuitry associated with any conventional dual tone multiple frequency (DTMF) telephone.

6 Claims, 4 Drawing Sheets

MODEM/TELEPHONE HANDSET CORD ADAPTOR

BACKGROUND OF THE INVENTION

1. Field of the Invention

This invention is generally directed to devices for interfacing a computer modem or a modem connected to a computer to a conventional telephone of the dual tone multiple frequency (DTMF) type so that a computer may be directly linked to the transmitter circuitry of the conventional telephone and more particularly to an interface adaptor which connects the input/output jack of a modem directly to the conventional plug which normally connects a telephone to a telephone handset. The adaptor of the present invention permits a modem to be connected in place of the standard telephone handset and thereby allows a computer to communicate directly through a conventional telephone even in instances where the telephone is a multiline telephone. The adaptor has the benefit of being very compact and requires no active electronic components and can be placed into operation without modification or disassembly to any portion of the telephone other than disconnecting the plug associated with the telephone handset and connecting the handset plug to one end of the adaptor of the present invention.

In two embodiments of the present invention, the adaptors are designed to be utilized with conventional modems however, in a separate embodiment the adaptors require a modification to the modem by providing an additional telephone input/output jack which will directly receive the plug normally used to connect the telephone handset cord to the handset.

2. History of the Related Art

With the advent of the newer laptop portable type computers, it is important to provide means for easily accessing the computers to conventional telephone systems including multiline telephone systems found in most offices and in many homes. In order to allow a computer to be interfaced with a telephone system so that digital information could be transmitted and received through the telephone system, it was originally necessary to provide a modem which would be wired or connected directly to a dedicated or single telephone line. A computer could then be connected through the modem so that digitally modulated signals could be transmitted through the modem to the dedicated telephone line. This type of dedicated line system is not satisfactory for computers of the portable type as such computers must be accessible to telephone lines at any number of sites or locations.

Due to the problem of dedicating a phone line to the modem to which a computer is connected, efforts have been made to provide switches or connectors which allow the computer modem to be connected through any one of the multilines associated with a multiline telephone system so that each of the lines can be utilized to transmit either voice or data as is necessary. Such systems avoid the need to dedicate an incoming line specifically for data transmission.

One prior method of directly connecting a modem to a multiline telephone system provided a portable modular jack which connected the modem directly in place of the transmitter microphone associated with a telephone handset. Such modular jacks are not efficient in that they require the disassembly of the mouth piece portion of the conventional telephone handset and the replacement of the transmitter with the connector associated with the modular jack. In addition, such connectors are not universally adaptable to be used with differing types or shapes of microphone transmitters found in varying types of conventional telephone handsets.

Another type of modem/telephone connector is disclosed in U.S. Pat. No. 4,543,450 to Brandt. The patent discloses an integrated connector and modem wherein the connector includes a housing in one end thereof in which a special modem is located so that the modem may be physically and electrically connected to the data terminal of a computer. The modem installed in the housing is connected through a telephone cable to a plug which is designed to plug into the telephone base unit in place of the telephone handset and its associated cable. In the patent, two wires are connected from the modem demodulator to the receiving circuitry in the telephone base unit while an additional two wires are used to connect the modem modulator to the transmitting circuitry in the telephone base unit. Such a connector or adaptor requires that the modem be contained integrally within the adaptive unit and therefore requires power from the computer terminal to energize the modem circuitry within the adaptor unit. The modem portion of the Brandt adaptor will therefore unnecessarily duplicate the function of a modem commonly found mounted within a laptop computer and also adds additional weight and space requirements. The Brandt connector or adaptor requires that the modem mounted within the adaptor housing be specially wired to make a four wire connection between the adaptor and the telephone and uses two wires for transmitting data and two wires for receiving incoming signals. Thus, the conventional telephone is utilized to separate the data into incoming and outgoing signals.

SUMMARY OF THE INVENTION

This invention is directed to an adaptor for connecting a computer modem or a modem which is connected to a computer to conventional dual tone multiple frequency telephones including multiline telephones wherein in a first embodiment the adaptor includes a two wire cable having a modular jack at one end thereof which is of a size to selectively receive the plug which normally connects a telephone handset cord with a telephone handset. The modular jack includes electrical contacts which connect the two wires of the cable to the pair of transmit wires associated with the telephone handset cord. The adaptor further includes a plug which is connected to the opposite end of the cable and which is of a size to be selectively receivable with the input/output jack associated with most conventional modems or computer modems.

In a second embodiment, the adaptor modular jack and plug associated with the first embodiment are incorporated into a common housing and are electrically connected by a pair of conductors which extend through the housing.

In a third embodiment, the adaptor is incorporated directly with a modem as a separate telephone inlet/outlet jack which is of a size to accept the plug which connects a telephone handset cord to a handset and which includes a pair of contacts which establish a circuit with the transmitter contacts of the handset plug.

It is the primary object of the present invention to provide adaptors which will permit computers to access telephone systems through modems which are selectively connected directly to the two transmitting wires of a conventional telephone handset cord.

It is another object of the present invention to provide inexpensive, compact and reliable adaptors for connecting modems to dual tone multiple frequency (DTMF) telephones without requiring a specific telephone line to be dedicated for digital data transmission and which permits telephones to be selectively used for either voice or computer data transmission and reception.

It is yet another object of the present invention to provide adaptors for connecting a computer modem to conventional dual tone multiple frequency telephones which require no active electrical components or supplemental power sources to permit digital data transmission or reception.

It is also an object of the present invention to provide adaptors for connecting a standard computer modem to a conventional DTMF telephone wherein the connectors use only two wires which carry bi-directional data and wherein data separation is done by the modem and not by the telephone.

It is a further object of the present invention to provide adaptors for connecting a modem to conventional multiline telephones of the dual tone multiple frequency (DTMF) type which require no disassembly of the conventional telephone set other than a disconnection of the plug associated with the cord or cable which connects the telephone to the telephone handset and thereafter connecting the plug either to a modular jack which is connected through a two wire cable or housing to the input/output of the modem, or to a separate input/output jack which is built directly into a modem.

It is also an object of the present invention to provide adaptors for interfacing computer modems with dual tone multifrequency telephones of the type having multiple lines so that portable computers may be connected to a telephone line easily and quickly for data transmission and reception at essentially any location where a DTMF telephone is available.

DESCRIPTION OF THE EMBODIMENT

With continued reference to the drawings, a first adaptor 10 of the present invention is shown as being selectively utilized to connect a modem or combination modem and computer 11 with a conventional multiline telephone 12. As previously discussed, it is the purpose of the present invention to provide an adaptor which will allow a modem or combination computer and modem to be connected directly to the transmitting circuit of a multiline or other dual tone multiple frequency telephone so that digital information may be communicated through any one of the lines to which the telephone may be accessed as opposed to voice communication. The invention therefore permits portable or laptop computers to be easily accessed to DTMF telephones in almost any location.

Figure 1:
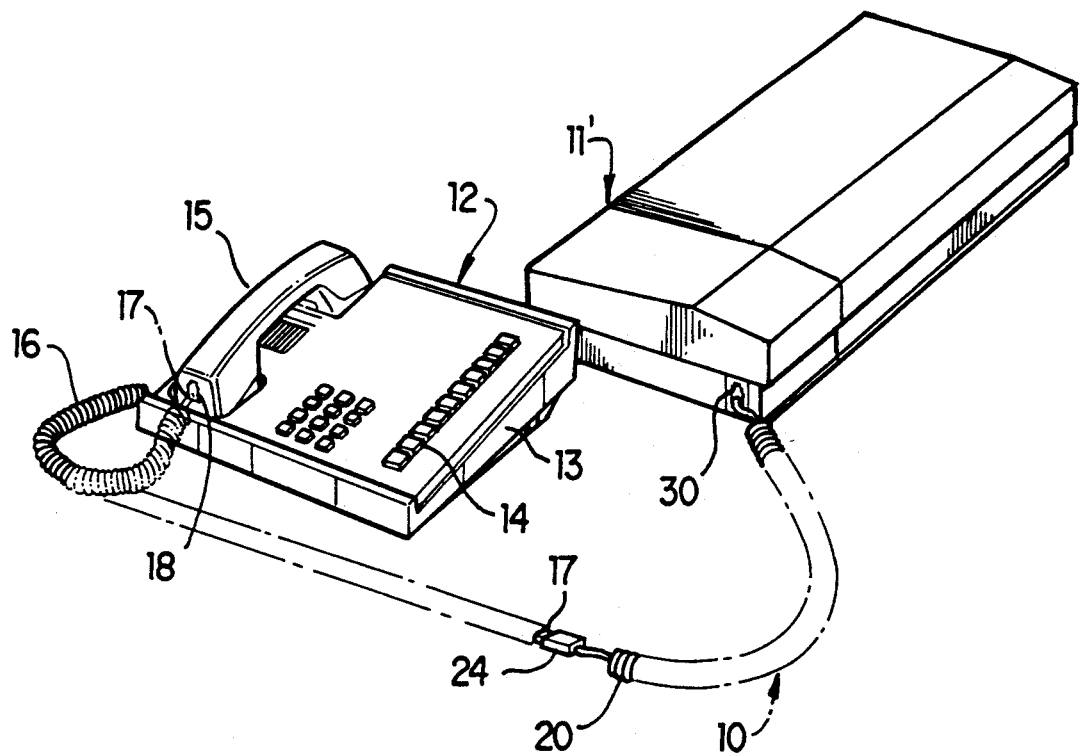
FIG. 1 is an illustrational view showing a conventional telephone handset of the multiline type having a handset cord which is normally connected to a telephone handset as is shown in dotted line in the figure, but which is also shown as being connected through the adaptor of the present invention to a conventional modem which, in the example shown, is mounted within a computer of the laptop type.
Figure 3:
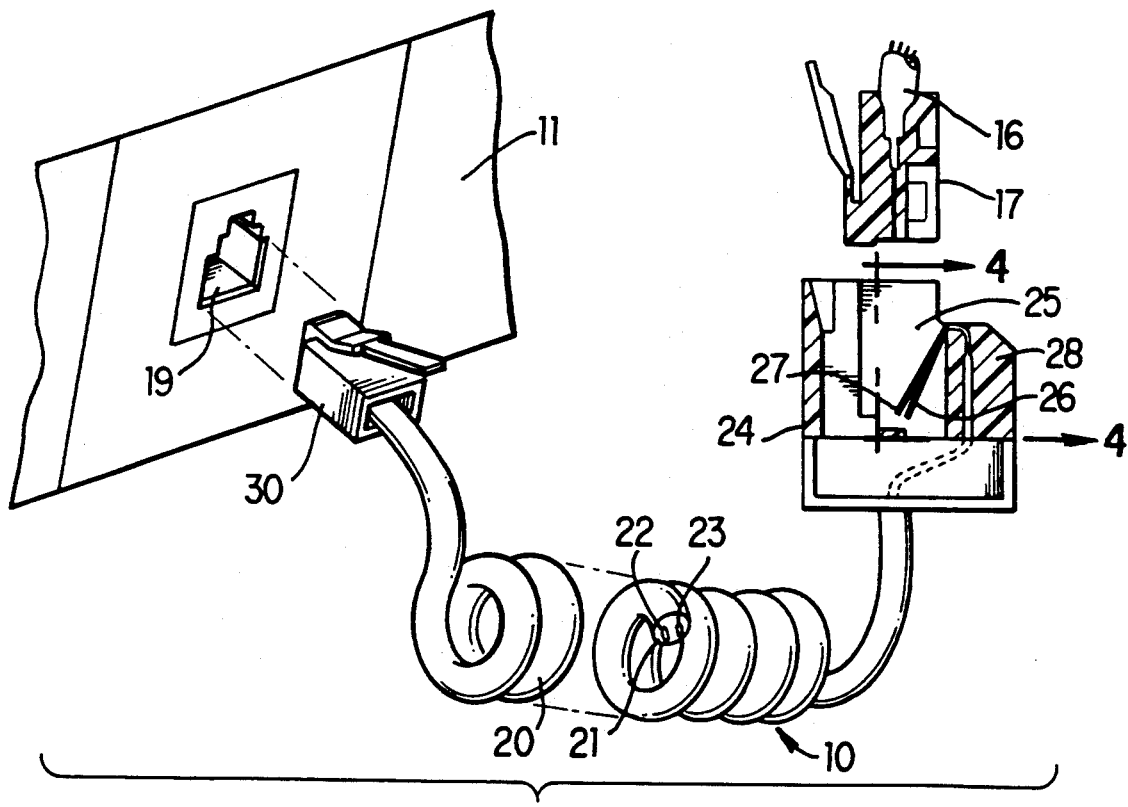
FIG. 3 is an enlarged assembly view having portions broken away showing the adaptor of the present invention having a plug which is selectively insertable into the standard jack of a modem and a modular jack for selectively receiving the plug which normally connects a telephone cable to a telephone handset.
Figure 4:
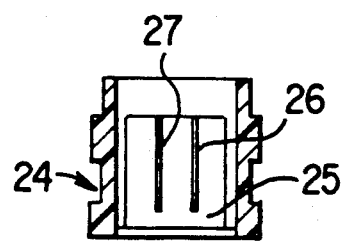
FIG. 4 is a cross sectional view taken along lines 4—4 of FIG. 3.

As shown in FIG. 1, telephone 12 includes a base 13 which houses the transmitting and receiving circuits for a plurality of telephone lines which are accessed selectively through the line buttons 14. The circuitry contained within the base 13 of the telephone are connected to the handset 15 by way of a coiled or flexible telephone cable 16 which includes an outer male plug 17, which is selectively receivable within a socket 18 provided at the base of the handset. In FIG. 1, the connection between the cord or cable 16 and the socket 18 is indicated in dotted lines. As shown in FIG. 3, the telephone cable 16 normally includes four conductors, two of which are associated with the handset transmitting circuit and two of which are associated with the handset receiver.

The modem or computer/modem combination 11 is preferably a laptop computer of any conventional type which includes a telephone line inlet/outlet jack 19. It should be noted that the adaptor of the present invention may be utilized with modems which are connected to computers through additional cables or cords.

The adaptor 10 of the present invention includes a cable 20 which is shown in the drawing figures as being spirally wound, however, the cable may be in the form of a flat or ribbon cable as desired. The cable includes an outer insulated cover 21 having embedded therein a pair of conductors 22 and 23.

Figure 2:
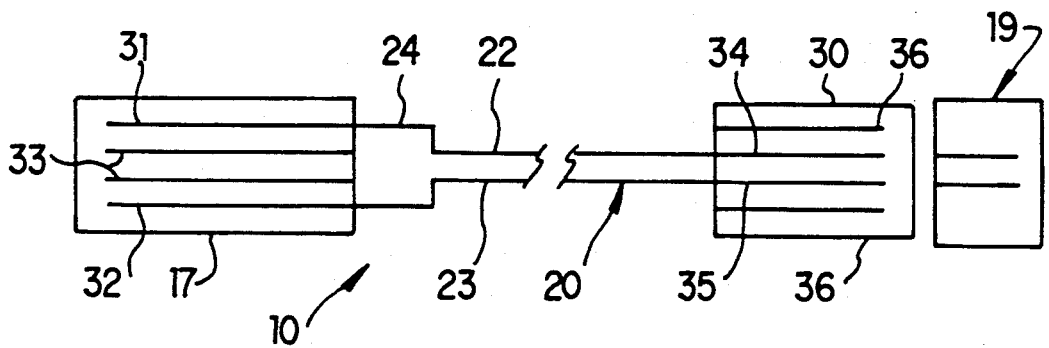
FIG. 2 is a diagrammatic view showing the adaptor of the present invention being connected between a conventional telephone and a modem.

One end of the cable 20 is connected to a modular jack 24 which defines a socket 25 into which the conventional handset plug 17 is selectively inserted as is illustrated in FIG. 3. The two conductors 22 and 23 are connected to a pair of flexible contacts 26 and 27 which extend inwardly of the socket 25 so as to selectively engage two of the four wire contacts normally associated with conventional plug 17. As shown in FIG. 2, the contacts 26 and 27 engage the outer or telephone handset cable transmitter wires 31 and 32. No contact is made with the handset receiver wires 33. The connection between the contacts 26 and 27 and the conductors 22 and 23 are made within the insulated side wall portion 28 of the modular jack 24.

As opposed to using a special jack 24 having only a pair of flexible contacts, it is possible to use conventional, off-the-shelf, jacks of the type which are normally used with standard plugs 17. Such jacks normally have four flexible contacts In these instances, only the two outer flexible contacts would be used and connected to the conductors 22 and 23.

The other end of the adaptor cable 20 terminates with a plug element 30 which is of a size to be cooperatively and selectively received within the input/output jack 19 of the computer modem 11. The plug 30 is of conventional configuration and is the type which is normally receivable within the input/output jack associated with most computer modems and are referred to as RJ-11 plugs. In this respect, the plug 30 is slightly different in configuration than the telephone handset plug 17.

The modular plug 30 which has been discussed as being of conventional construction normally includes four electrical contact elements which are spaced with respect to one another. However, the input/output jack associated with most conventional modems is designed to use only two of the four contacts associated with such plugs. Therefore, as shown diagramatically in FIG. 2 of the drawings, the two conductors 22 and 23 are connected through the two inner electrical contact elements 34 and 35 of the plug 30 to the input/output jack. The outer contact element 36 are not used. If preferred, a specially designed plug 17 may be used which would incorporate only two electrical contacts which would be aligned similarly to the contacts 34 and 35.

It has been determined that bi-directional transmission of data can be accomplished through the use of the two wire adaptor of the present invention by utilizing the handset transmitter wires 31 and 32 associated with the telephone handset cable 16. Although there is some slight loss of signal level associated with data traveling in opposite directions because of isolation networks in the telephone base unit, such losses have proven not to be disruptive to normal communication which would affect data transmission to or from the modem or computer modem Therefore, a computer may be effectively connected by the adaptor of the present invention to a multiline or other telephone system. If connections are made so that the handset receiver wires 33 are utilized, the loss in data transmission level is such as to interfere with the normal transmission of data, and, therefore, such connections will not permit the satisfactory transmission of data to or from a computer through a modem.

In the use of the adaptor 10 of the present invention, the conventional modular plug 17 associated with the telephone handset is simply disengaged from the socket 18 in the base of the handset and is thereafter inserted into the modular jack 24 so that a connection is established between the transmitting circuit wires 31 and 32, of the telephone handset cable 16 and the two conductors 22 and 23 of the cable 20. Thereafter, the modular plug 30 at the other end of the adaptor is inserted into the input/output jack of the computer modem so that a circuit is established between the telephone and the computer modem. With the adaptor in place, the computer may be utilized to access a telephone line of a multiline system with the modem allowing digital transmission through the two wires of the adaptor to any one of the multiple lines associated with a conventional telephone. The adaptor of the present invention may also be utilized with single line telephone if desired.

Figure 5:
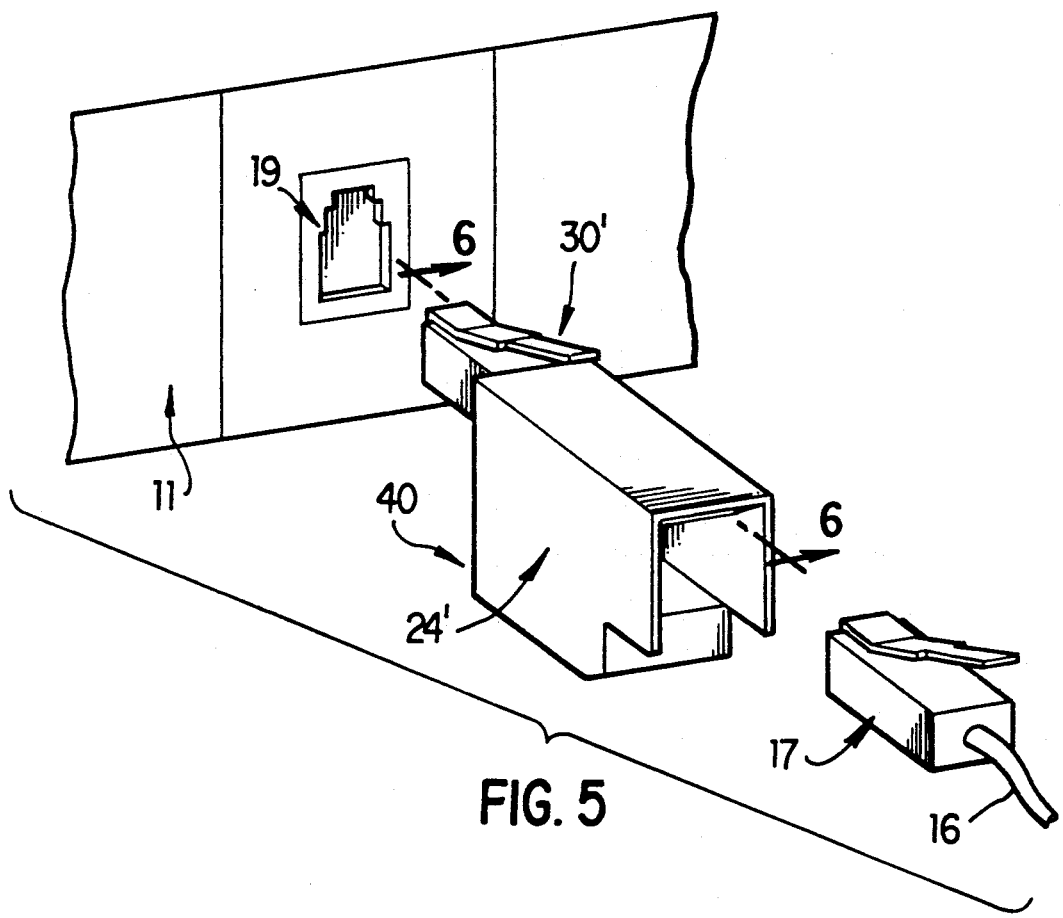
FIG. 5 is an enlarged assembly view of a second embodiment of the present invention.
Figure 6:
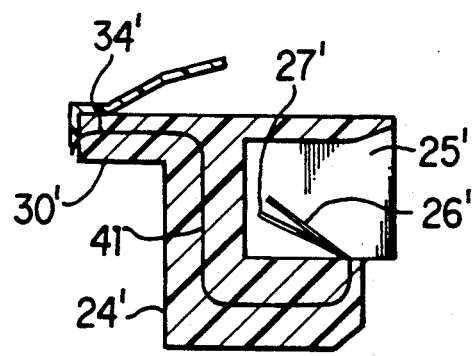
FIG. 6 is a cross sectional view taken along lines 6—6 of FIG. 5.

With reference to FIGS. 5 and 6 of the drawings a second embodiment of the present invention is disclosed in greater detail In the second embodiment, the adaptor 40 is constructed as a unitary housing incorporating the elements of the modular jack 24 and the plug element 30 of the first embodiment In this manner, there is no need to provide an intermediate cord between the two elements as was disclosed in the first embodiment The first portion of the housing 24' includes a recessed jack 25' having a pair of contacts 26' and 27' disposed therein. The size and configuration of the jack opening 25' is such as to receive the conventional plug 17 associated with the telephone handset cord 16.

The second portion of the housing of the second embodiment 40, includes a male plug element 30' which is identical in configuration to the plug 30 disclosed in the first embodiment. The difference however is that there are only two electrical contact elements mounted within the plug 30'. These electrical contacts would be aligned similar to the electrical contacts 34 and 35 disclosed in FIG. 2 with respect to the first embodiment. The two electrical contacts are aligned with the two electrical contacts associated with the jack 19 in the modem. The electrical contacts are generally shown at 34' in FIG. 6 of the drawings. These contacts are connected by a pair of electrical wires 41 which extend through the housing to the contact elements 26' and 27' associated with the modular jack portion of the housing 24'.

In the use of the second embodiment of the invention, once the handset cord has been disconnected from the telephone handset, the handset plug 17 is inserted within the jack portion 24' of the adaptor 40 so that the transmitting electrical contact wires 31 and 32 are in electrical contact with the contact elements 26' and 27'. Thereafter, the adaptor 40 is inserted into the jack 19 associated with the modem 11 by aligning the second portion of the adaptor 30' with the jack 19 as is shown in FIG. 5 of the drawings.

Figure 7:
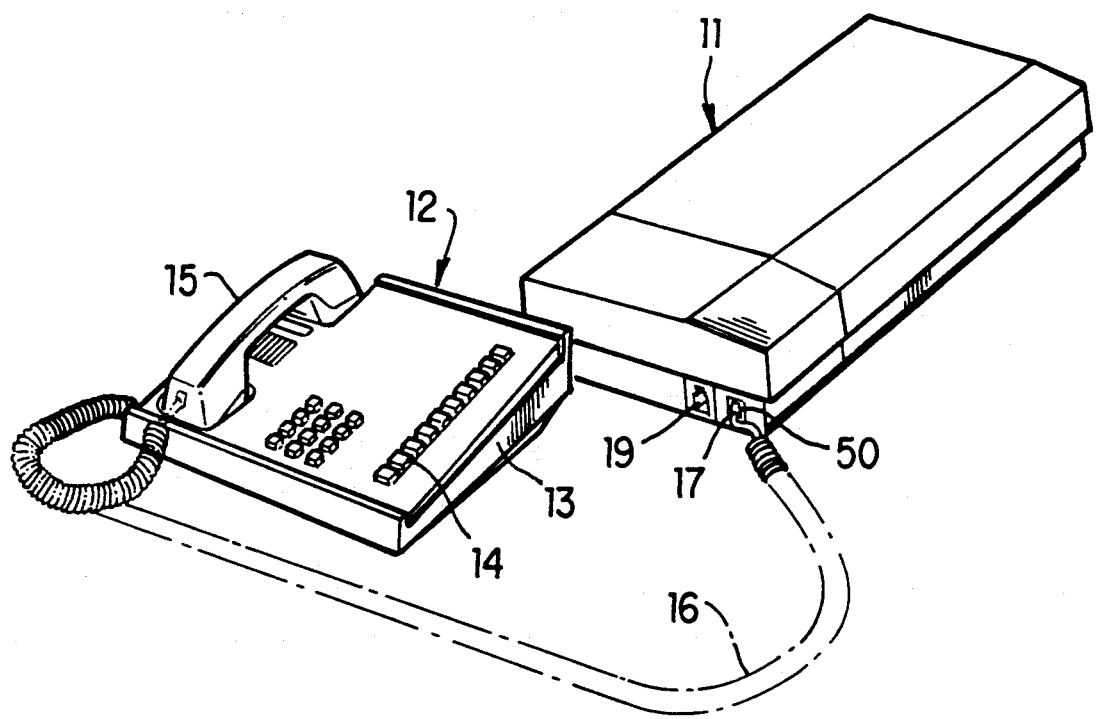
FIG. 7 is an illustrated view of a third embodiment of the present invention showing a telephone handset cord being plugged into a separate jack associated with a conventional modem.
Figure 8:
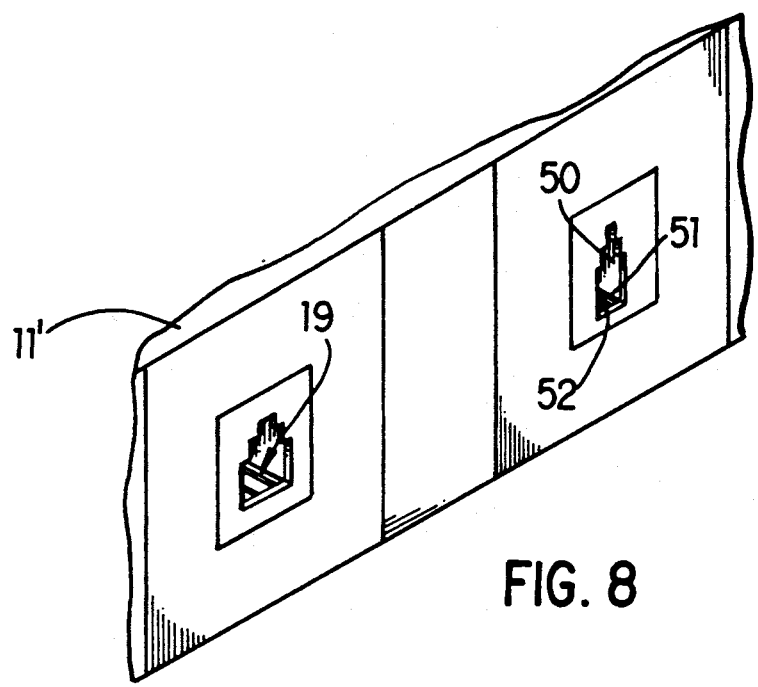
FIG. 8 is an enlarged partial view of the auxiliary input/output jack of FIG. 7.

A further embodiment of the present invention is disclosed in FIGS. 7 and 8 of the drawings. In this embodiment, it is necessary to modify the modem or combination modem and computer by incorporating auxiliary jack 50 adjacent to the conventional telephone jack 19. In this embodiment, the modified modem indicated at 11' would have side-by-side communication jacks with the two electrical contact elements of the conventional jack 19 being wired within the modem to two electrical contacts associated with the smaller jack 50. The size of the jack 50 is the same as the size of jack shown in the first embodiment at 24. In this respect, the input/output jack 50 is of a size to receive a conventional handset cord plug such is shown at 17 in the drawing figures. The jack includes a pair of special contact elements 51 and 52 similar to those at 26 and 27 in FIG. 3 of the drawings with these contacts being directly electrically connected to the two contact elements associated with the conventional jack 19.

With the third embodiment, with the modification being made to the modem or computer modem combination, it is only necessary to insert the plug 17 associated with the handset cord 16 directly into the specialized input/output jack 50 so that the transmitter wires associated with the telephone handset 31 and 32, as show in FIG. 2, are electrically contacted with the pair of spaced electrical contacts 51 and 52 within the jack. In this manner, the modem circuitry is directly connected with the transmitter wires associated with the conventional telephone handset cord so the data may be transmitted bi-directionally through the transmitter wires of the handset cord.

I claim:

1. An adaptor for connecting a computer modem to a conventional dual tone multiple frequency telephone having a handset cord which includes a pair of transmitter wires and a pair of receiver wires and which also has a modular plug for selectively connecting the handset cord to a telephone handset and which plug includes a pair of first contact elements which are connected to the pair of transmitter wires and wherein the modem includes an input/output jack having a pair of second contact elements therein, the adaptor comprising a first connector means, said first connector means including a first pair of electrical contacts, said first connector means being of a size to cooperatively receive the modular plug of the handset cord therein so that said first pair of electrical contacts of said first connector means are in contact with the pair of first contact elements of the modular plug of the handset cord, a second connector means, said second connector means having a second pair of electrical contacts, first and second conductor means for electrically connecting said first pair of electrical contacts directly to said second pair of electrical contacts, and said second pair of contacts being spaced so as to contact said second pair of contact elements when said second connector means is selectively inserted within the input/output jack of the modem whereby the pair of second contact elements of the modem are connected to the telephone through the pair of transmitter wires of the handset cord.

2. The adaptor of claim 1 in which said first and second conductor means extend through an insulated cable.

3. The adaptor of claim 1 in which said first and second connector means are mounted within a common housing.

4. The adaptor of claim 3 in which said first connector means includes a socket within said housing of a size to receive the modular plug of the handset cord, said first pair of electrical contacts being disposed within said socket, and said second connector means including an outwardly extending plug.

5. An adaptor for connecting a computer modem to a conventional dual tone multiple frequency telephone having a handset cord which includes a pair of transmitter wires and a pair of receiver wires and which also has a modular plug for selectively connecting the handset cord to a telephone handset and which plug includes a first pair of contact elements which are connected to the pair of transmitter wires of the handset cord, and wherein the modem includes an input/output jack, the adaptor comprising, an insulated cable having first and second ends, a pair of conductor wires extending through said cable, a modular jack mounted to said first end of said cable, said modular jack having a socket with a second pair of contact elements therein which are directly electrically connected to said pair of conductors of said cable, said socket being of a size to cooperatively receive the modular plug of the handset cord therein so that said second pair of contact elements of said modular jack are in contact with the first pair of contact elements of the handset cord, a modular plug means mounted to the second end of said cable, said modular plug means having another pair of electrical contacts which are directly electrically connected to said pair of electrical conductors of said cable so that said first and second contact elements are directly electrically connected through said cable, and said modular plug means being of a size to be selectively inserted within the input/output jack of the modem whereby the modem is connected to the telephone through the pair of transmitter wires of the handset cord.

6. An adaptor for connecting a computer modem to a conventional dual tone multiple frequency telephone having a handset cord which includes a pair of transmitter wires and a pair of receiver wires and which also has a modular plug for selectively connecting the handset cord to a telephone handset and which plug includes at least a pair of first contact elements which are connected to the pair of transmitter wires, wherein the adaptor comprises, an input/output jack mounted within the modem and having a pair of second contact elements spaced from one another, said input/output jack being of a size and configuration to selectively receive the modular plug of the handset cord, said second pair of spaced contact elements being positioned so as to be in engagement with the first pair of contact elements of the modular plug when the modular plug is inserted within said input/output jack whereby the modem is connected to the telephone through the pair of transmitter wires of the handset cord.

* * * * *